United States Patent [19]
Granbom

[11] Patent Number: 5,111,913
[45] Date of Patent: May 12, 1992

[54] BRAKING ARRANGEMENT IN OPERATING DEVICES FOR LINEAR MOTION

[76] Inventor: Bo Granbom, Södergatan 5, S-736 00 Kungsör, Sweden

[21] Appl. No.: 647,780

[22] Filed: Jan. 30, 1991

[51] Int. Cl.$^5$ ............................................. F16D 63/00
[52] U.S. Cl. ...................................... 188/67; 188/170; 92/88
[58] Field of Search ................... 188/170, 42, 43, 67; 91/88

[56] References Cited

U.S. PATENT DOCUMENTS

| | | | |
|---|---|---|---|
| 3,163,380 | 12/1964 | Brodie | 244/63 |
| 4,419,924 | 12/1983 | Peter et al. | 188/67 |
| 4,825,746 | 5/1989 | Herner | 92/88 |

*Primary Examiner*—Joseph F. Peters, Jr.
*Assistant Examiner*—Anne E. Bidwell
*Attorney, Agent, or Firm*—Michael, Best & Friedrich

[57] ABSTRACT

The present invention relates to a brake arrangement in linear motion operating devices of the kind which comprises a cylinder (1), a piston which is movable in the cylinder, and a rail (3) which is mounted on the outside of the cylinder (1), parallel with the cylinder axis, and which extends substantially along the whole stroke path of the piston. The rail is configured with slide surfaces (8) on opposite sides thereof, and the arrangement further comprises a slide (14) which is configured with slide shoes (15) and which is guided for linear movement along the slide by the slide surfaces (8), this slide being connected to a dogging element (2) connected to the piston. The arrangement is characterized in that the rail has formed therein at least one cavity (9) which extends along the rail (3) and which is open through the intermediary of a passageway (10), whereby the rail presents at least one leg (11) which is resilient in a direction transversely to the cylinder axis and which defines one side of the passageway, and which leg is intended to coact with a brake body (21) mounted on the slide (14) and having a brake surface (22). The cavity can be placed under pressure so as move this one side of the leg out of coaction with the brake surface.

14 Claims, 5 Drawing Sheets

BRAKING ARRANGEMENT IN OPERATING DEVICES FOR LINEAR MOTION

The present invention relates to a braking arrangement in operating devices intended for linear motion, comprising a cylinder and a piston arranged for movement in the cylinder.

Particularly with pressure-fluid piston-cylinder devices which operate with compressible media, such as compressed air, considerable difficulties are encountered in braking the piston and holding the piston the piston rod—in one or more predetermined positions along the stroke path of the piston. Such braking may include successive retardation of the piston and also instantaneous braking of the piston or holding the piston in a stopped position. Among the various solutions proposed for stopping a pressure-fluid pistoncylinder device, particularly air-activatable pistoncylinder devices, the Swedish Patent Application No. 8704397-2 proposes a braking arrangement which includes a leg that can be brought into braking engagement with a brake shoulder mounted on the movable part of the operating device. The leg, together with a seal, encloses a cavity in which, for instance, pneumatic pressure can be generated in order to move the leg out of engagement with the brake shoulder, or alternatively to move the leg into engagement with said shoulder. Although this type of braking arrangement functions satisfactorily, it involves additional structuring which makes it necessary to mount a relatively large additional part externally of the cylinder. This results in the occupation of valuable space and makes it difficult, or renders it impossible, to add further auxiliary devices to the cylinder, such as guide systems, for instance, used to relieve the piston or its dogging elements from direct load. This type of guide system is becoming more and more usual, and consequently the described braking arrangement has limited application.

The object of the present invention is to provide a braking arrangement which will occupy as little space as possible on one side of the cylinder and which will enable a guide system or a guide rail also to be mounted on the cylinder. This object is achieved with an inventive arrangement having the characterizing features set forth in the following claims.

The invention will now be described in more detail with reference to exemplifying embodiments thereof illustrated schematically in the accompanying drawings, in which.

According to the illustrated embodiment, the inventive brake arrangement is mounted adjacent a pistoncylinder device 1 which has no piston rod, i.e. a device in which the cylinder presents along its length a slot through which a dogging element 2 attached to the reciprocatingly movable piston in the cylinder extends. The slot is sealed witht he aid of a steel strap. The piston-cylinder device may, of course, be of any other kind and does not form part of the present invention.

A rail 3 is attached on the side of the cylinder, parallel with the cylinder axis, with the aid of parallel splines 4 which engage in corresponding, parallel undercut grooves 5 in the cylinder mantle. The rail 3 is locked to the cylinder with the aid of wedge-shaped devices 6, the oblique surfaces of which abut the outer surface of the cylinder and also surfaces on the rail 3, these devices being locked together by means of screws 7. The manner in which the rail is secured constitutes no part of the actual invention per se. Naturally, the rail may be attached in other ways.

When seen in cross-section, the rail 3 is provided on mutually opposite sides thereof with flat slide surfaces 8 which are disposed angularly to one another. The rail is also provided with internal cavities 9 which extend along the rail and which are open in the vicinity of respective slide surfaces 8 through the intermediary of a respective passageway 10.

In the illustrated embodiment, the rail forms, with the aid of the cavities 9 and the passageway 10, a leg 11 which, due to the intrinsic properties of the railmaterial, is resilient in a direction towards and away from the cylinder axis, i.e. upwardly and downwardly in the plane of the drawings The leg is manoeuvred by applying pressure in the cavity 9, which can be effected with the aid of pressurized air conducted through a hose 12 provided in the cavity. The reference 13 identifies a rod or a strap, for instance made of plastic, which is intended to fill-out the space within the hose and therewith reduce air consumption. The reference 13' identifies a protective strap loosely mounted in the passageway so as to permit resilient movement of the leg and to separate the cavity 9 from the passageway 10. A slide 14 provided with a dogging element 2 is configured with slide shoes 15 which, in coaction with the slide surfaces 8 on the rail 3, carry and guide the slide 14, which as a result of its connection with the dogging element 2 on the piston is moved reciprocatingly along the rail 3.

Figure 1:
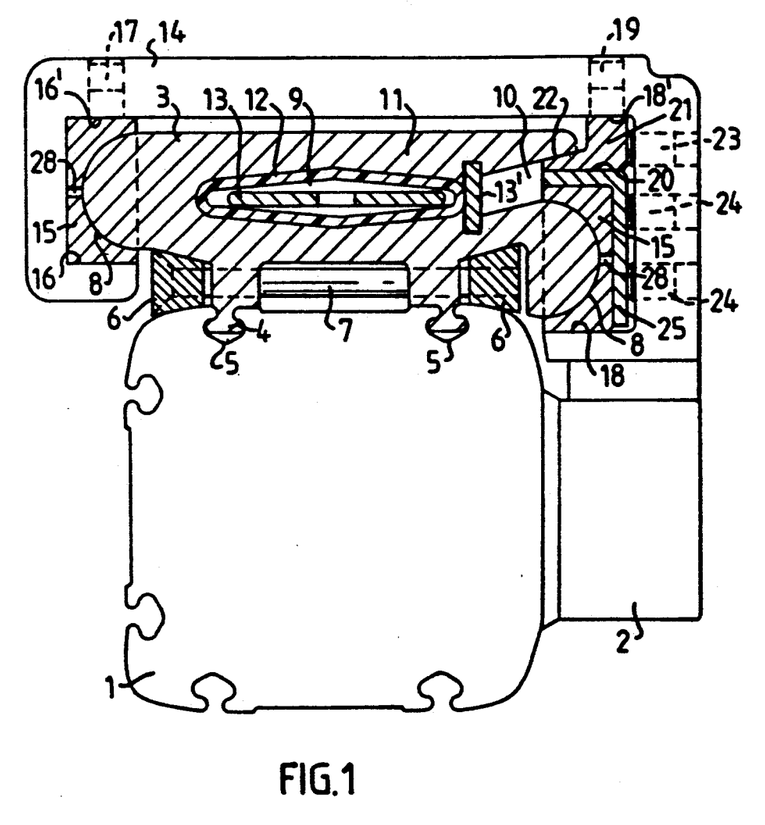
FIG. 1 illustrates one embodiment in which brake body and brake surface are arranged adjacent one slide surface of the rail.

One of the slide shoes 15, for instance the slide shoe shown to the left in FIG. 1, is accommodated between two abutment surfaces 16 and 16', of which the latter surface is adjustable and is formed by screws 17 screwed into the slide 14 (of which screws only one is shown, although it will be understood that a suitable number of screws 17 are disposed sequentially in a row along the side). The screws 17 function to lock the slide shoe 15 to the slide 14. The other slide shoe, i.e. the slide show shown to the right in FIG. 1, supports against an abutment surface 18 and, indirectly (as described below) also against an abutment surface 18', which is formed by screws 19 screwed to the slide 14. This slide shoe 15 can be said to be divided in two parts, which are separated by means of a support surface 20 and which are located in a plane located in the passageway 10. The part 21 remote from the slide surface 8, or the upper part as seen in the Figure, forms a brake body having a brake surface 22 which coacts with a side of the leg 11 that defines part of the passageway 10. The position of the brake surface of said brake body 21 relative to said side of the leg 11 can be adjusted by means of rows of screws 23 screwed into the slide 14 (of which screws only one is shown in the Figure), such that a suitable clearance can be maintained between the brake surface 22 and the surface of the leg which coacts with said surface when the slide is free to move, i.e. not braked. The reference 24 identifies two rows of screws which enable the clearance between the slide surfaces 8 and the slide shoes 15 to be adjusted. In the FIG. 1 embodiment, a stiffening plate 25 is placed around the slide shoe 15 in order to prevent deformation of the slide shoe, said plate also forming an abutment for the screws 24.

In brief, the arrangement operates in the following manner. In the absence of pressure in the cavity 9, the inherent resilience of the leg 11 will urge the leg towards and against the brake surface 22 of the brake body 21, therewith stopping the slide 14 in a given position. When the cavity is pressurized, e.g. by introducing air through the hose 12, the leg is pressed out so as to lighten the pressure of the leg surface on the brake surface 22. The slide 14 is therewith able to move freely along the rail 3. In this state of the leg, the clearance between the brake surface 22 and the leg surface has been adjusted at a determined pressure in the hose 12, for optimum function of the brake. A higher pressure in the cavity 9 enables the brake body 21 to be adjusted to a position further into the passageway 10, which affords a more powerful braking action, due to the resilient force exerted by the leg, when the pressure in the cavity ceases.

Figure 2:
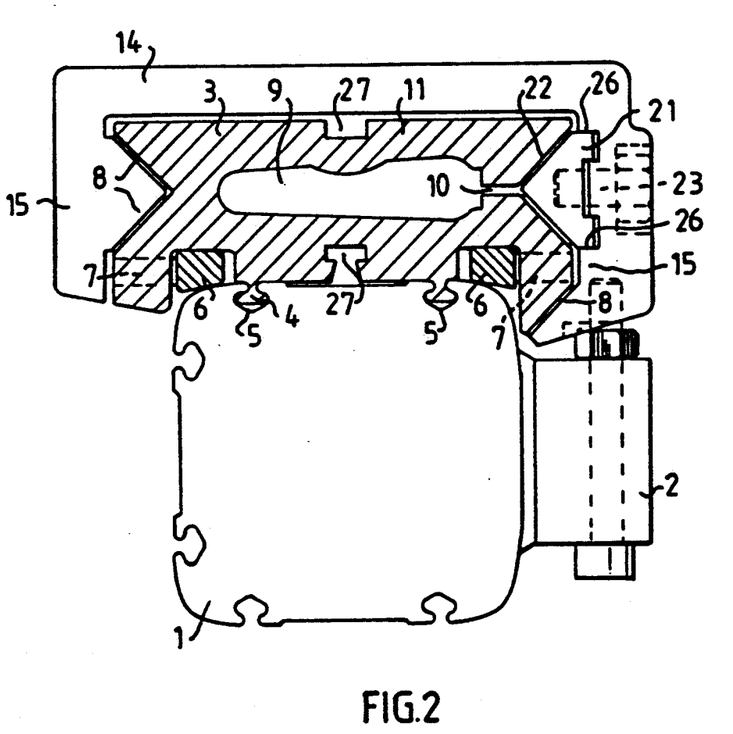
FIG. 2 illustrates an embodiment alternative to the embodiment illustrated in FIG. 1.

As will be seen from the Figure, the slide shoes are divided into two halves—see the gap 28—which enables the slide shoes to be adjusted towards the slide surfaces 8 with the aid of the screws 17 and 19, while at the same time enabling the slide shoes to be subsequently adjusted in order to compensate for wear, for instance, FIG. 2 illustrates another embodiment of the invention, where those components which correspond to the components of the FIG. 1 embodiment have been identified with the same reference signs. In this embodiment, the rail 3 is provided with prism-shaped slide surfaces 8, which coact with complementary surfaces on the slide shoes 15 of the slide 14. The main difference between this embodiment and the FIG. 1 embodiment is that the brake body is configured integrally with an adjustable part of the slide shoe 15. Thus, the brake shoe 21, including the slide shoe, can be adjusted with the aid of a row of screws 23 in a direction towards and away from the passageway 10, in order to achieve efficient operation of the slide 14 and of the brake body 21, the brake surface 22 of which coacts with one side of the leg, such as to form a lateral defining wall of the passage 10. Since the brake body 21 also includes the slide surface 8, it is necessary, in order to guide the slide with precision, to fixate the body 21, as seen in the cross-direction of the slide, i.e. in the up-and-down direction as seen in the Figure. To this end, the brake body 21 is let into that side of the slide which is provided with abutment surfaces 26, as indicated in FIG. 2. It will readily be understood that this arrrangement can be adjusted readily to the same extent as the arrangement illustrated in FIG. 1, due to the fact that the brake body includes both the brake surface and the slide surface, it being necessary to align this latter surface in relation to its coacting slide surface 8 in order to achieve correct functioning of the slide.

The Figure shows another arrangement of the wedge-shaped devices 6 by means of which the rail is secured to the cylinder 1. The rail 3 is also provided with grooves 27 which extend along the length of the rail and which are intended to accommodate a toothed belt of a kind which is common in this technique, for the purpose, for instance, of controlling limit switches or for programming piston movement.

It will be understood that the arrangement illustrated in FIG. 1 can conceivably be constructed with prism-shaped slide surfaces and slide shoes according to FIG. 2.

In the Figures, a dogging element 2 is shown fixed to the slide 14 by means of a screw for instance, as indicated in FIG. 2. This attachment may, of course, be made resilient or "floating", i.e. the dogging element takes-up solely axial forces from the slide.

Figure 3:
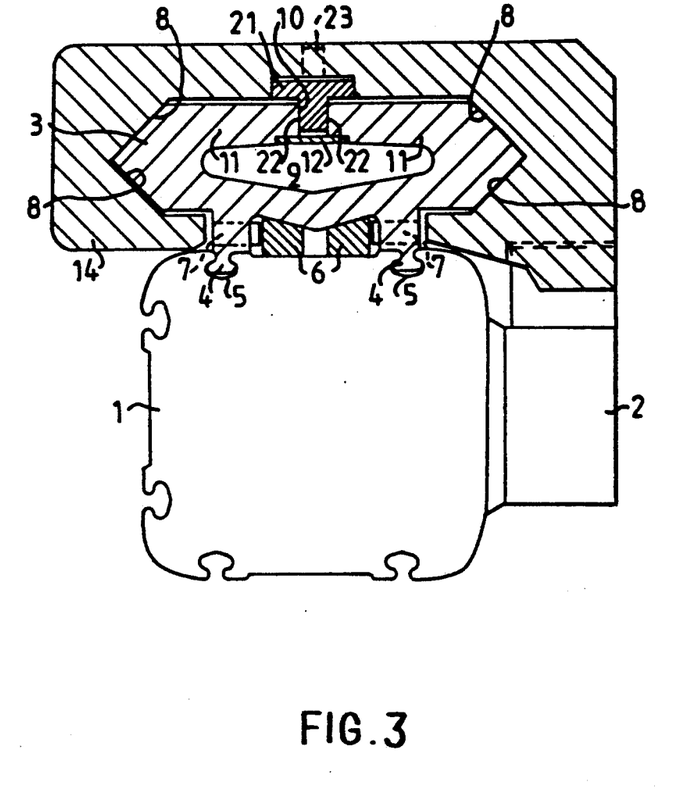
FIG. 3 illustrates an embodiment in which brake body and brake surface are arranged between the slide surfaces of/the rail.

In the embodiment illustrated in FIG. 3, a rail 3 is attached to the side of the cylinder, parallel with its axis, with the aid of parallel splines 4 which engage in corresponding, parallel undercut grooves 5 in the cylinder mantle. The rail 3 is locked to the cylinder with the aid of wedge-shaped devices 6, the oblique surfaces of which abut the outer surface of the cylinder and also abut surfaces on the rail 3, and which are locked together by means of screws 7. This method of attachment forms no part of the actual invention per se, and may, of course, be effected in other ways.

In the illustrated embodiment, the rail 3 is provided on mutually opposite sides thereof, as seen in section, with flat slide surfaces 8 which are positioned angularly to one another. Extending within the rail 3 and along said rail is a cavity 9, which, through a passageway 10, is open towards the flat outer surface of the rail 3, approximately centrally between the slide surfaces 8. With the aid of the cavity 9 and the passageway 10, the rail is formed with two legs 11 which, in view of the properties of the material from which the leg is made, are resilient in a direction towards and away from the cylinder axis, i.e. in an up and down direction as seen in the plane of the paper. The legs are manoeuvred by applying pressure in the cavity 9, which is effected by introducing air into the cavity through a hose or pipe (not shown). The reference 13' identifies a protective band which is loosely mounted in the passageway in order to allow the legs to move resiliently and to separate the cavity 9 from the passageway 10.

A slide 14 mounted on the dogging element 2 is configured with slide shoes 15 which coact with slide surfaces 8 on the rail 3 in a manner to support and to guide the slide 14, which due to its connection with the dogging element of the piston is moved reciprocatingly along the rail 3.

The slide 14 is provided with a brake body 21 which is fixed to the slide and a part of which extends down into the passageway 10. The brake body has two mutually opposing brake surfaces 22, which coact with the leg surfaces defining the passageway 10.

In the case of passive braking, i.e. in the absence of pressure in the cavity 9, the aforesaid leg surfaces are held in engagement with the brake surfaces of the brake bodies 21, by the resilient spring action of the legs 11, therewith preventing movement of the slide 14 along the rail 3. When the cavity 9 is placed under pressure, the legs 11 will spring outwards with force components directed both upwardly and to respective sides, as seen in the Figure. This causes the aforesaid leg surfaces to move away from the brake surfaces 22, therewith releasing the brake.

The brake surfaces 22 are preferably inclined, in a wedge-like fashion, towards one another and a row of screws 23 is provided by means of which the brake body 21, which has a corresponding wedge-shape, can be moved to a greater or a lesser extent into the passageway 10, therewith adjusting the brake action and also the pressure required in the brake cavity 9 to release the brake.

Positive braking can be achieved through the coaction of the outer edge surfaces of the legs 11, the upper edges surfaces as seen in the Figure, with brake surfaces disposed on the underside of the brake body 21. In the absence of pressure in the cavity 9, the legs will take the position illustrated in the Figure, wherewith it shall be understood that the brake body 21 has no braking part which extends into the passageway 10. When the cavity 9 is placed under pressure, the legs 11 will be urged resiliently outwards and the upper edge surfaces of the legs will be pressed against the downwardly facing brake surfaces of the brake body 21. The clearance between the edge surfaces of the legs and the brake surfaces of the brake body can be adjusted with the aid of screws 23.

Figure 4:
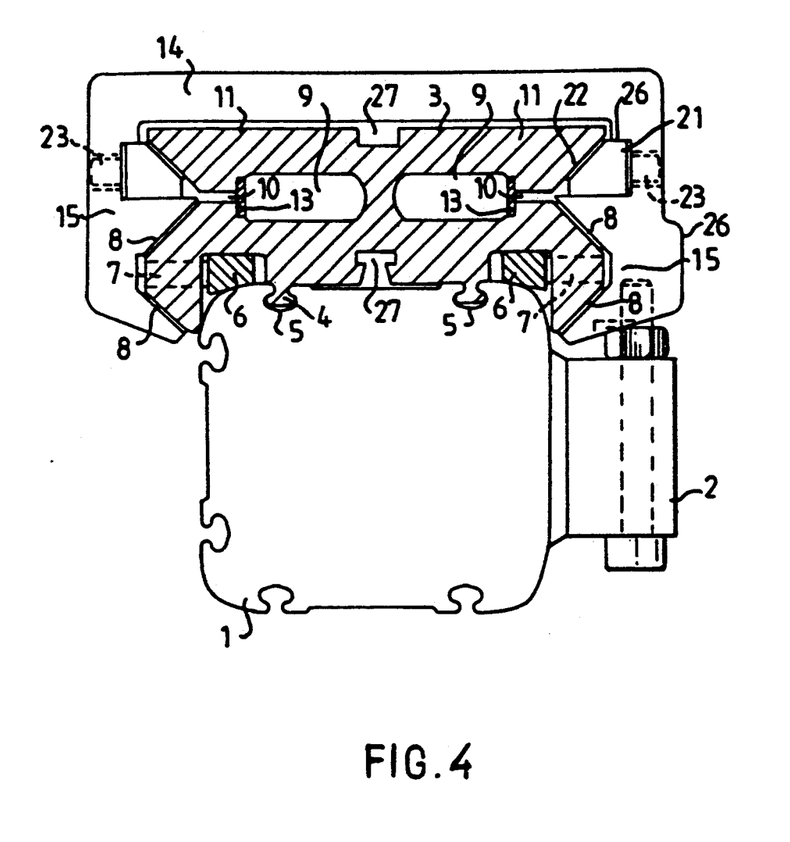
FIG. 4 illustrates an embodiment in which brake body and brake surface are arranged adjacent both slide surfaces/of the rail.

A further embodiment is illustrated in FIG. 4. In this case, the slide 14 is provided with two wedge-shaped brake bodies 21 which can be adjusted with respective brake surfaces relative to said sides of the legs 11 with the aid of rows of screws 23 each screwed into the slide 14 (only two of which are shown in the Figure), in a manner to maintain an appropriate clearance between brake surface 22 and the leg surface which coacts with said brake surface when the slide is free to move, i.e. not braked.

In the illustrated embodiment, a flat surface on respective brake bodies 21, this surface guiding said body, rests on a corresponding surface on the slide 14, with the oblique surface 22 of the brake body 21 forming the brake surface which engages the corresponding brake surface on the slide 14.

In brief, the illustrated arrangement operates in the following manner. In the absence of pressure in the cavities 9, the inherent resiliency of the legs 11 causes the leg surfaces to be urged against the respective brake surfaces 22 of the brake bodies 21, therewith braking or stopping the slide 14 in a given position. When the cavities are placed under pressure, the legs are urged outwardly, therewith removing the leg surfaces from the brake surfaces 22. The slide 14 can therewith move freely along the rail 3. In this position of the legs, achieved at a given pressure in respective cavities 9, the clearance between respective brake surfaces 22 and the leg surfaces can be adjusted for optimum functioning of the brake. A higher pressure in the cavities 9 will enable the brake bodies 21 to be adjusted to a position located further in respective passageways 10, which results in a more powerful braking action, due to the spring force exerted by the legs, when the pressure in the cavities ceases.

Figure 5:
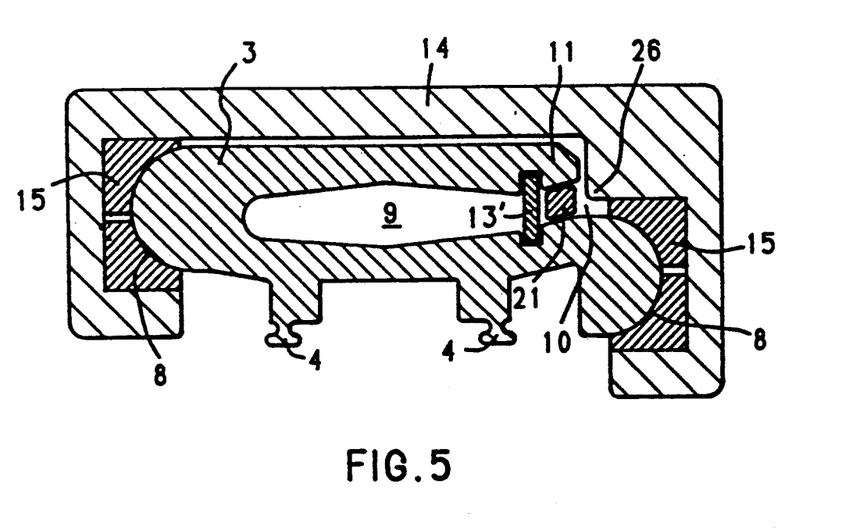
FIG. 5 illustrates a further variant of the invention.

FIG. 5 illustrates a further embodiment of the invention, which is comparable with the embodiments illustrated in FIGS. 1 and 2. In the case of the FIG. 5 embodiment, however, the brake body 21 is able to "float freely" in the passageway 10 when the slide 14 is not braked, i.e. when the leg 11 of the rail 3 is in an outwardly swung position. The brake body 21 is prevented from moving axially in the slide 14, with the aid, for instance, of end plates screwed firmly to the slide (not shown). The brake body 21 is prevented from leaving its position in the passageway 10, by means of a shoulder 26.

In other respects, this embodiment of the invention operates in a manner corresponding to that described with reference to FIGS. 1 and 2, and the remainder of the components of this arrangement are identified by the same reference signs as those used earlier.

The rail 3 is attached in a manner similar to that described with reference to FIGS. 1 and 2, with the aid of splines 4.

I claim:

1. A brake arrangement in linear motion operating devices, comprising a cylinder (1), a piston which is movable in said cylinder, and a rail (3) which is mounted on the outside of the cylinder (1), parallel with the cylinder axis, and extends substantially along the whole of the path travelled by the piston in effecting a working stroke, said rail being configured with slide surfaces (8) on opposite sides thereof, and further comprising a slide (14) which is configured with slide shoes (15) and which is guided for linear movement along said slide cy the slide surfaces (8), said slide (14) being connected to a dogging element (2) connected to the piston, characterized in that the rail has formed therein at least one cavity (9) which extends along the rail (3) and which is open through the intermediary of a passageway (10), whereby the rail presents at least one leg (11) which is resilient in a direction transversely to the cylinder axis and which defines one side of the passageway, and which leg coacts with a brake body (21) mounted on the slide (14) and having a brake surface (22), wherein the cavity can be placed under pressure for the purpose of moving said one side of said passageway.

2. A brake arrangement according to claim 1, characterized in that the brake body (21) is arranged in the passageway (10) and is loose in said passageway when the slide (14) is not braked; and in that the brake body is able to move substantially freely in the axial direction of the slide (14).

3. A brake arrangement according to claim 1, characterized in that the rail (3) has a cavity (9) which is open at one slide surface (8) of the rail through the intermediary of the passageway (10), whereby the rail (3) presents a leg (11) which is resilient in a direction transversally to the cylinder axis and which defines one side of the passageway (10).

4. A brake arrangement according to claim 3, characterized in that a surface of the brake body (21) remote from the brake surface (22) forms a slide shoe of the slide (14). (FIG. 2).

5. A brake arrangement according to claim 3, characterized in that a surface of the brake body (21) remote from the brake surface (22) rests on a support surface (20) of the adjoining slide shoe (15).

6. A brake arrangement according to claim 5, characterized in that said adjoining slide shoe (15) of the slide (14) is lockably adjustable in a direction towards and away from the slide surface (8) of the rail (3).

7. A brake arrangement according to claim 6, characterized in that respective slide shoes (15) comprise mutually separated slide-shoe parts which can move relative to one another, and in that one part can be moved towards the other part by means of adjusting means (17, 19) in order to take-up play, caused by wear, for instance.

8. A brake arrangement according to claim 1, characterized in that the passageway (10) opens on one side of the rail between the slide surfaces (8) thereon, whereby the rail presents two legs of which at least one is resilient in a direction transversely to the cylinder axis and which has a surface which is able to coact with the brake surface on a brake body (21) mounted on the slide, in dependence on the pressure prevailing in the cavity.

9. A brake arrangement according to claim 8, characterized in that the brake body (21) has a part which extends into the passageway (10) and which coacts with the surfaces of the opposing legs.

10. A brake arrangement according to claim 8, characterized in that the brake surface of the brake body (21) is located outside at least one leg (11) for coaction with the outer edge surface of said leg.

11. A brake arrangement according to claim 9 or 10, characterized in that the brake body is adjustable in a direction towards and away from said leg surfaces.

12. A brake arrangement according to claim 1, characterized in that the rail (3) has two cavities (9) which are open at respective slide surfaces (8) of the rail through the intermediary of the passageway (10), whereby the rail (3) will present two legs (11) which are resilient in a direction transversely to the cylinder axis and which define one side of respective passageways (10); and in that respective legs (11) coact with a brake means (21) mounted on the slide (3) and provided with a brake surface (22).

13. A brake arrangement according to claim 11, characterized in that respective brake means (21) are wedge-shaped, with the narrower edge facing towards the passageway (10).

14. A brake arrangement according to claim 10, characterized in that the brake body is adjustable in a direction towards and away from said leg surfaces.

* * * * *

UNITED STATES PATENT AND TRADEMARK OFFICE
CERTIFICATE OF CORRECTION

PATENT NO. : 5,111,913
DATED : May 12, 1992
INVENTOR(S) : Bo Granbom

It is certified that error appears in the above-identified patent and that said Letters Patent is hereby corrected as shown below:

Column 1, line 12 "piston the" should read "piston -- the".

Claim 1, Column 6, line 18, "cy" should read "by".

Claim 11, Column 7, line 11, delete "or 10".

Signed and Sealed this

Fifth Day of October, 1993

BRUCE LEHMAN

*Attest:*

*Attesting Officer*  *Commissioner of Patents and Trademarks*